United States Patent [19]

Lahr

[11] 4,308,601
[45] Dec. 29, 1981

[54] ECHO RANGING APPARATUS AND METHOD

[75] Inventor: William E. Lahr, Compton, Calif.
[73] Assignee: David R. Plotnik, Redondo Beach, Calif. ; a part interest
[21] Appl. No.: 163,595
[22] Filed: Jun. 27, 1980
[51] Int. Cl.$^3$ .............................................. G01S 15/96
[52] U.S. Cl. .................................................. 367/115
[58] Field of Search ........................ 367/115, 113, 107

[56] References Cited

U.S. PATENT DOCUMENTS 3,098,210 7/1963 Sparling et al. ...................... 367/115
3,383,650 5/1968 Drenkelfort ........................ 367/115

OTHER PUBLICATIONS

Three page excerpt from Vexilar, Inc., fish locating apparatus.
Two pages showing Ray Jefferson, Inc., fish locating apparatus.
Schematic for Lowrance Electronics, Inc., fish locating apparatus.

*Primary Examiner*—Richard A. Farley
*Attorney, Agent, or Firm*—Nilsson, Robbins, Dalgarn, Berliner, Carson & Wurst

[57] ABSTRACT

Echo ranging apparatus to locate fish, vegetation and structure in the sea modifies signals presented to a recorder in the apparatus so as to enhance the capability of the user to distinguish fish in the vicinity of vegetation and structure, including the sea bed. A transducer receives the reflected echo signals. A receiver stage and amplifier stage present signals which, apart from the modification, would be conventionally useful in aiding the user to locate fish. However, a signal modifier connected at the output of the amplifier stage, between the amplifier stage and the input to the recorder, substantially enhances the capability of the apparatus. It does so by shunting signal reducer circuitry in parallel at the output of the amplifier when the level at the output surpasses a predetermined level, to reduce the signal levels at such output while retaining variations in such signal levels. Such retention, as opposed to, e.g., blanking out the output or setting the output to a fixed level, preserves information as to the source of the echoes which is present in such variations. By setting the triggering of the shunt connection at a high level corresponding to the echo from the sea bed, the sea bed will be indicated by a signal at a high level followed, after a time delay, by a steep reduction in level. Recordation of the information may be accomplished by providing the amplifier output signal, as modified, to the stylus of an electrochemical recorder, the stylus burning through a cover layer to a degree which depends on the level of the signal. With a graphite underlayer, and successive, straight, parallel traces along the paper, one per explorer pulse, the fish, vegetation and structure (including the sea bed) are shown on the recorder paper.

14 Claims, 5 Drawing Figures

ECHO RANGING APPARATUS AND METHOD

BACKGROUND OF THE INVENTION

The field of the invention pertains to electronic apparatus which transmits signals into the sea, and electronically responds to the echo signals to visually display fish, vegetation and structure causing the echo signals.

Echo ranging apparatus to aid fishermen in locating fish in the sea has long been of interest to fishermen.

Traditionally, this involves a transmitter, which transmits pulsed bursts to a transducer which converts these bursts of electrical energy to bursts of ultrasonic energy transmitted by the sea. Typically, the echo signals are then reconverted to electrical energy (by the same or a different transducer) and electronically treated, including amplification, to determine through a varying voltage level, a visual display of the fish, vegetation and structure (including the sea bed) causing the echoes.

This type of system has been and is presently being used, but has left fishermen with much to be desired. In particular, the visual display (which is typically accomplished by electrochemical paper which converts voltage levels to degrees of lightness and darkness) presents difficulties at distinguishing between the sea bed and fish near or along the sea bed where they commonly are, or fish among vegetation.

To address this, several approaches have been attempted with some degree of success. According to one approach, exemplified by Sparling et al, U.S. Pat. No. 3,098,210, apparatus is connected between stages which carry out the amplification function to cause a blanking (essentially a terminating) of the signal presented to the electrochemical paper when the signal reaches a predetermined level, e.g., corresponding to the strong signal of the sea bed. This approach results in the loss of information during such blanking, after the echo from the sea bed or the echo from other matter (e.g., fish) which may cause such blanking. The blanking is typically for a time interval which is substantially less than the time it takes to receive the echoes from a signal pulse (and to print a corresponding line along the paper). However, the blanking, upon its initiation, can be maintained until after the echo signals from the pulse have terminated (and the line has been printed). This latter approach may result in the loss of information over a relatively long interval following the initiation of any blanking. The former approach may result in successive losses of information due to successive instances of blanking along a printout line.

Another approach in effect provides three set output levels, dependent upon the range in which the levels of the echo signals fall. It is apparent that this limitation to three discrete levels also results in the sacrifice of substantial information.

The present invention substantially advances the art of echo ranging apparatus by displaying a continuum of variations resulting from variations in the levels of the echo signals, both before a high triggering level is reached and after the triggering, by reducing the levels after such triggering while preserving information-carrying variations.

SUMMARY OF THE INVENTION

In accordance with the invention, echo ranging apparatus to locate fish, vegetation and structure in the sea, includes: transmitter means for transmitting pulsed explorer signals into the sea; transducer means for receiving echo signals resulting from the reflection of the explorer signals from the fish, vegetation and structure and for converting the echo signals to electrical transducer signals representative of the echo signals; receiver means for coupling to the transducer means to provide electrical receiver signals representative of the electrical transducer signals in response to the electrical transducer signals; amplifier means for coupling to the receiver means to provide amplified electrical signals representative of the electrical receiver signals; modifying means for coupling to the amplifier means to modify the amplified electrical signals; and display means for coupling to the amplifier means to provide visual displays representative of the fish, vegetation and structure in response to the modified amplified signals. Such modifying means includes: threshold detector means for coupling to the amplifier means to provide electrical signals indicative of the levels of the amplified electrical signals, to compare the indicative signals with a reference signal and to provide detector output signals indicative of such comparing; delay means coupled to the threshold detector means to provide, in response to the detector output signals, delay output signals indicative, after a time delay, of such comparing; and signal reduction means for coupling to the amplifier means to, in response to indications by the delay output signals of such indicative signals surpassing the reference signal, reduce the levels of the amplified electrical signals while retaining variations in such levels.

The signal reduction means may include a resistor for coupling in parallel with the amplifier means for such reducing by the signal reduction means. Also, the providing of the visual displays by the display means may include adjusting a variable, e.g., the degree of lightness and darkness along a continuum, along successive straight lines of such displays in response to the modified amplified signals. Further, each of the amplifier means, threshold detector means and signal reduction means may have a terminal for the modified amplified electrical signals, such terminals being adapted for direct connection to one another.

A method of locating fish, vegetation and structure in the sea is in accordance with the above apparatus.

DETAILED DESCRIPTION

Figure 1:
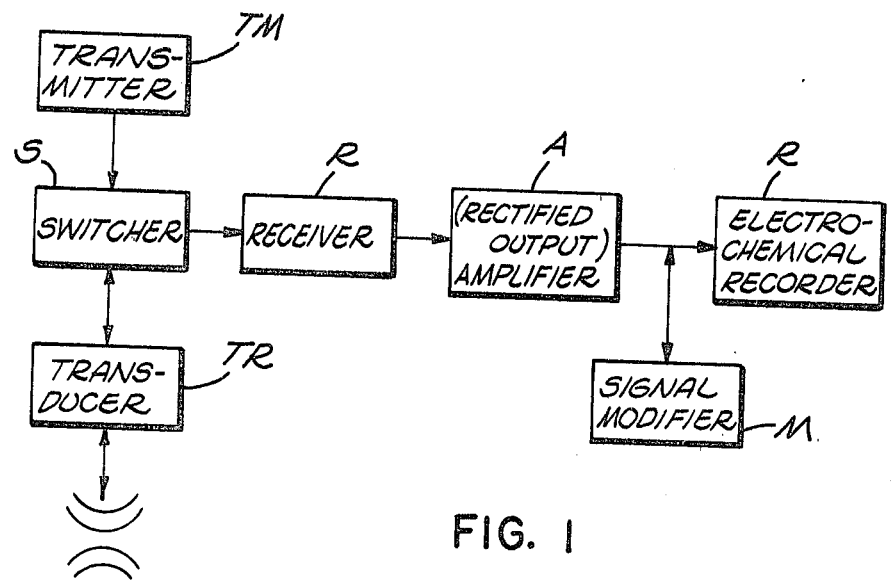
FIG. 1 is a block diagram of echo ranging apparatus, in accordance with the invention, to locate fish, vegetation and structure in the sea.

Referring to FIG. 1, a transmitter TM through an electronic switcher S transmits successive electrical energy pulses to an electrical to ultrasonic transducer TR. The switcher also provides the transmitter pulses to a receiver R so that, after they are acted upon by an amplifier A and a signal modifier M, they may be displayed to a user of the apparatus on an electrochemical recorder R. The main concern, however, is the echo signals resulting from the reflection of the transmitted ultrasonic transducer signals from fish, vegetation and structure (including the sea bed) in the sea. The switcher, following its channeling of a transmitter pulse to the transducer and to the receiver, channels electrical transducer signals representative of the returning echo signals to the receiver for treatment by the amplifier and modifier to provide the input signals for the display of the fish, vegetation and structure by the electrochemical recorder.

In the present embodiment, the ultrasonic signals from the transducer, the echo signals and the electrical signals caused by the echo signals through the receiver, amplifier and into the electrochemical recorder are at a frequency of about 75 kilohertz; and the stylus on the electrochemical recorder is responsive to the envelope of such signals. In particular, the varying degree to which this envelope burns an overlayer, covering a layer of graphite, on the base of the electrochemical paper of the recorder, determines the degree of lightness and darkness of the display at various points thereon.

Figure 5:
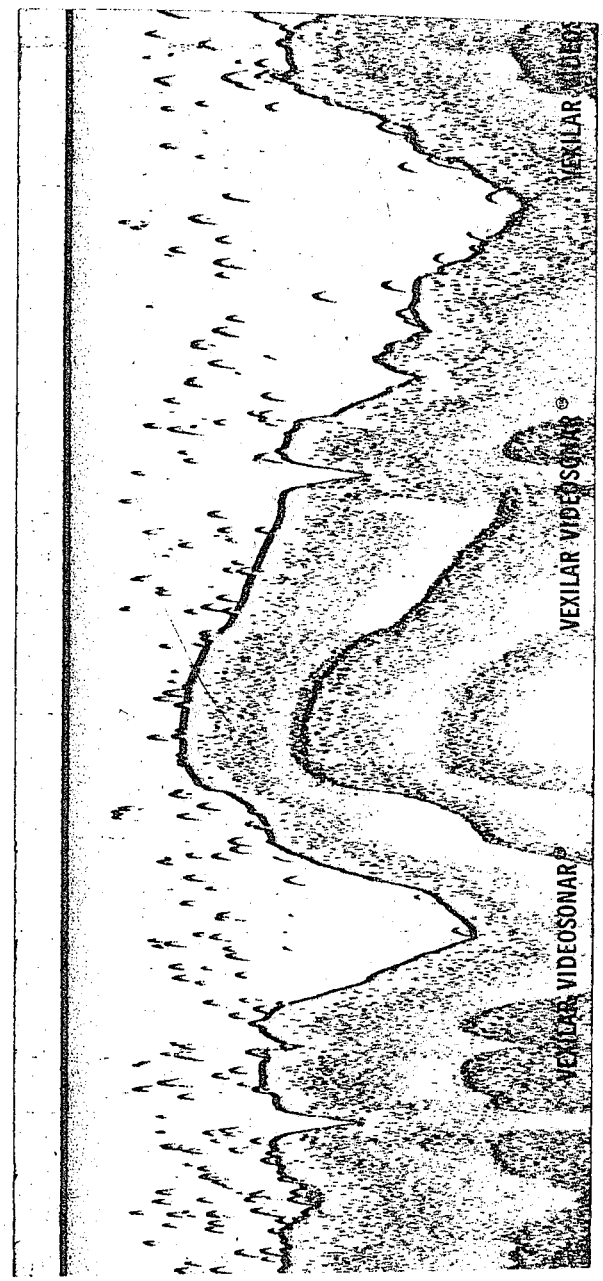
FIG. 5 shows a visual display which has been recorded by echo ranging apparatus in accordance with the invention.

This may be appreciated by reference to FIG. 5, showing an actual display. By reference to FIG. 5, it will be appreciated that the movement of the stylus in a single, straight vertical line (with respect to the paper as represented in the drawing) corresponds to a single transmitter pulse (near the top) and the echo signals resulting from that pulse. The next successive line then corresponds to the next transmitter pulse and the resulting echo signals. On the display, the dark horizontal line near the top then corresponds to a series of transmitter pulses; the first dark, wavy, generally horizontal line near the middle corresponds to the sea bed (the one below it being a second sea bed echo); and the generally inverted V shapes both above and along such sea bed line, generally represent fish either above the sea bed or along the sea bed.

Returning to FIG. 1, the transmitter TM, switcher S transducer TR, amplifier A and electrochemical recorder R are conventional devices, commonly employed in conventional echo ranging apparatus. As for the signal modifier M, which is described in detail herein, it both detects and modifies the level of the envelope at a single connection point between the amplifier output and the stylus of the recorder. (See FIG. 3.)

Figure 2:
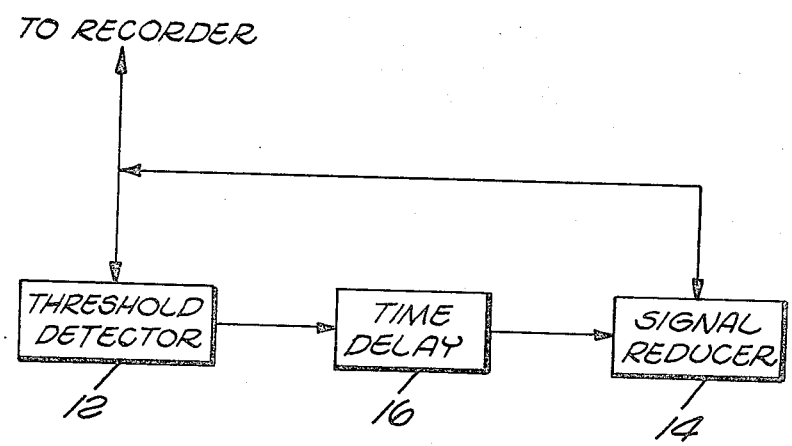
FIG. 2 is a block diagram showing the signal modifier of the apparatus of FIG. 1 in additional detail.

Referring to FIG. 2, which shows the signal modifier M in somewhat more detail, a threshold detector 12 responds to the level of the signal at the amplifier output passing a level which causes a signal established in the detector indicative of such level to surpass a reference signal established in the detector. After the passage of an interval following such response, a time delay portion 16 of the modifier causes a signal reducer 14 to be coupled in shunt (parallel) at the connection between the amplifier and the electrochemical recorder, to reduce the envelope of the input to the recorder and stylus. This reducing continues until the amplifier output is at a level corresponding to an input to the transducer which is below the sensitivity of the apparatus—e.g., during receipt of echoes from a transmitted explorer pulse, corresponding to an absence of echo signals. The shunt connection of the signal reducer in effect is broken when the amplifier output so falls. This, in effect, connection and disconnection, depending on the gain adjustment of the amplifier A, may occur once during the echo signals from an explorer pulse, or several times. The result is an enhanced capability to locate fish among vegetation and along the sea bed. As will become evident, the time delay, implemented by the time delay portion 16, may be varied through a variable component in the time delay portion.

FIG. 4(a) is an idealized version of an output envelope of the amplifier A without the presence of the modifier M. In the present embodiment, the output of the amplifier A is a rectified output of about 75 kilohertz signals. Such rectification might typically be achieved by, looking into the amplifier A, conventional circuitry including a diode, used for rectification purposes, connected in series with the secondary coil of a transformer used to step up the voltage at the output of the amplifier to a level sufficient for the electrochemical recorder. In the present embodiment, for reasons which will subsequently become apparent, such output of the amplifier should, however, be maintained above zero during the excursions of the 75 kilohertz signals, and only approach zero when the envelope itself goes to zero. The amplifier, of course, includes a gain control adjustment (as previously noted) and a power amplifier at the output stage thereof sufficient for the needs of the electrochemical recorder. Typically, the rectified output level would range up to about 150–250 volts.

As already stated, the apparatus of FIG. 1, apart from the modifier M, is of a type that is well-known. In particular, an example of apparatus in accordance with FIG. 1, apart from the modifier, is apparatus sold by Vexilar, Inc. under the designation 555 or NJA-511. Thus, the modifier M may be easily connected to modify the operation of conventional apparatus so as to enhance its operation. Alternatively, the complete apparatus might be made at one time, including the modifier M. It is also noteworthy that the 75 kilohertz electronics of the present embodiment is only exemplary. Thus, the modifier incorporates the capability for interfacing with a variety of frequencies at an output of an amplifier. For some amplifiers and apparatus, this could in fact vary from the frequency at which some of the stages of the amplifier are designed to operate. This versatility of the modifier is considered a significant advantage. The particular receiver R of FIG. 1, conventionally follows the general form of an amplitude modulation (AM) receiver, which is designed to treat electrical signals to be amplified without changing the frequency thereof.

Now referring to the idealized envelope of FIG. 4(a), it is idealized to facilitate the explanation herein. In this respect, the transducer TR in practice receives reflections of the ultrasonic signals it transmits within a cone-shaped volume. This should make apparent that, e.g., fish that are in fact horizontally displaced from one another along a horizontal line, on the display output will appear above one another. This is a condition that users of echo ranging apparatus readily contend with. However, to facilitate the description, it is assumed that the amplifier output signal without the modifier M, of FIG. 4(a), corresponds to a first fish substantially above the sea bed, vegetation growing from the sea bed presenting the majority of its growth somewhat above the sea bed with less growth immediately above the sea bed, and a fish along the sea bed near the area of less growth, all generally directly below the transducer. In accordance with this, an initial rise and fall 20 along the envelope of the unmodified amplifier output signal is then assumed to correspond to the first fish; a following null portion 22 is assumed to correspond to water under the first fish; a subsequent rise and commencement of a fall 24 (such rise being lower than that for the fish) is assumed to correspond to the vegetation; a second rise and commencement of a fall 26 is assumed to correspond to the fish along the sea bed; and a final rise above a triggering voltage level T and fall 28 is assumed to correspond to the sea bed.

Figure 3:
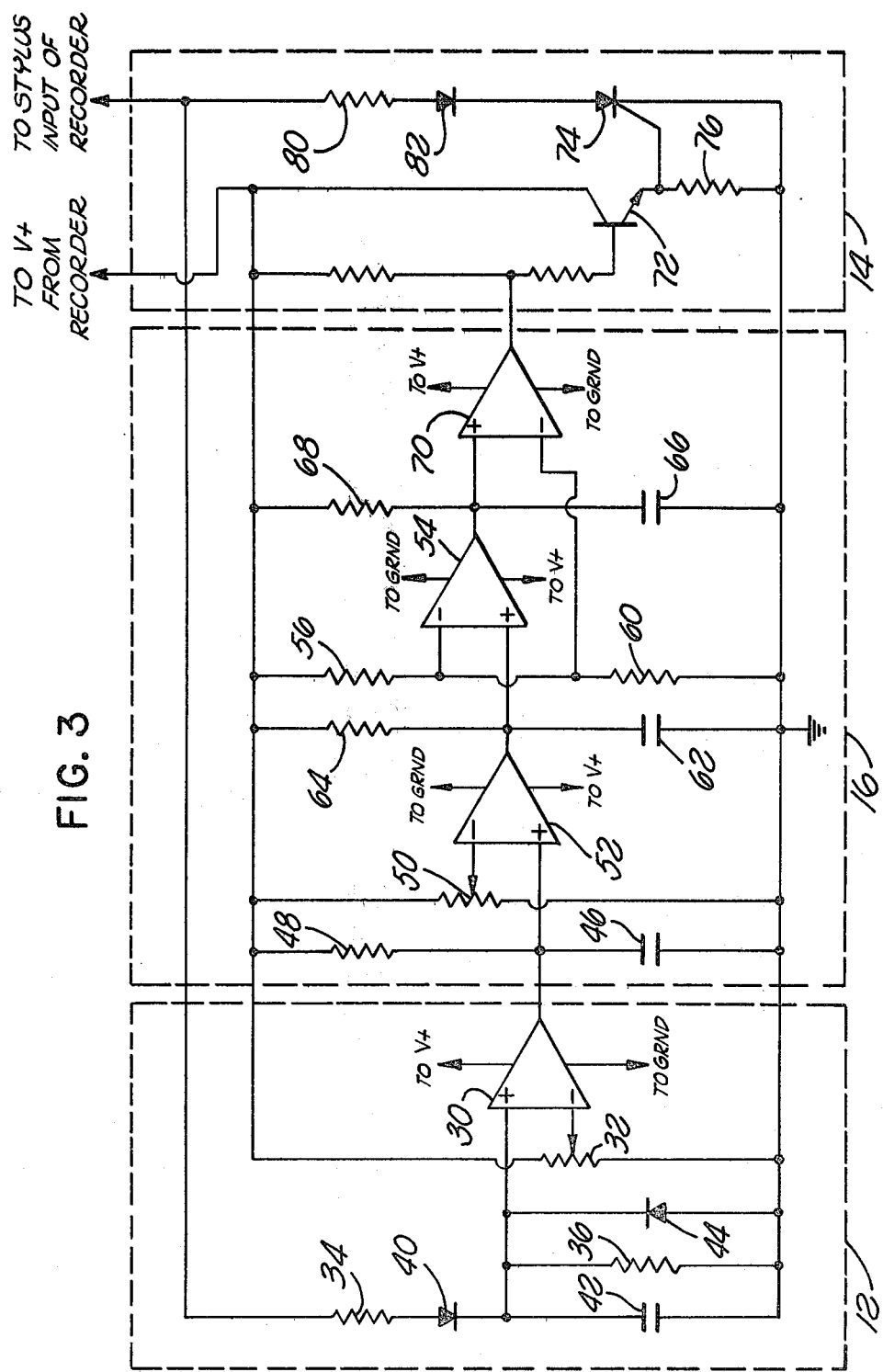
FIG. 3 is a schematic diagram showing the signal modifier in yet additional detail.

Now referring to FIG. 3, and to the details of the modification of the amplifier output signal of FIG. 4(a), to a modified amplifier output signal as illustrated in FIG. 4(c), reference will be made to the details of the modifier M, shown in FIG. 3.

The modifier M is connected to a positive bias voltage V+ provided by the recorder R. This voltage biases the electronic devices of the modifier. In the threshold detector 12 of the modifier, a detector comparator 30 has a negative terminal which is impressed with a reference voltage for the modifier through a potentiometer 32 which is connected between V+ and ground. The positive terminal of the detector comparator takes its voltage from a terminal between an initial 34 and final 36 resistor in a voltage divider network. A detector input diode 40 decouples the positive input of the comparator from the stylus input of the recorder when their relationship reverse biases the diode. An input capacitor 42 removes any spikes and switching transients which might otherwise be present at the positive input of the comparator, and a protector diode 44 protects the positive input of the comparator from negative spikes which could damage the comparator. The input capacitor 42, in connection with the resistors, also somewhat smooths out the effect of the "higher" frequency signals within the envelope at the positive input of the comparator.

When the input to the stylus of the recorder passes a level which causes the signal at the positive input of the detector comparator 30 to surpass the voltage at the negative input, a low output at the output of the comparator rises to a high output which in effect permits the external circuitry to determine the output. This results in the charging of a delaying capacitor 46 at a time constant determined by the capacitor and by a pull-up resistor 48, such resistor and capacitor providing the delay in a first delay stage of the time delay portion 16 of the modifier M.

The length of this delay may be externally adjusted by a delay potentiometer 50 from which the negative input of a first delay stage comparator 52 is taken. Such adjustment would typically provide a range for the total delay of the time delay portion 16 of the modifier of several hundred to several thousand microseconds.

Upon the transition to high of the first delay stage comparator 52, a second, non-variable time delay is similarly implemented in a second stage of the time delay portion 16. In this stage, the negative input of a second delay stage comparator 54 is taken from the resistor connection along a second delay stage resistor ladder including an initial 56 and final 60 resistor. A second delay stage capacitor 62 and second delay stage pull-up resistor 64 determine the time constant for this stage.

A third series delay is analogously implemented in a third delay stage having a time constant determined by a third delay stage capacitor 66 and a third delay stage pull-up resistor 68.

As the output, following the total series time delay, of the third delay stage comparator 70 goes high, the input to the base of a triggering transistor 72 also goes high, causing the emitter of the transistor, which is directly connected to the gate of a silicon controlled rectifier 74 and connected to ground through an emitter resistor 76, to provide a gating current to the SCR 74. This gating current, occurring at the same time as, to the SCR 74, a high input to its anode, through an SCR input resistor 80 and input diode 82, causes the SCR to be turned on. This enabling of the SCR places its input resistor or, to the amplifier, a shunt resistor, in parallel with the amplifier A and recorder R at the output of the amplifier and input to the stylus of the recorder. Due to this shunt, the signal at this connection point will be reduced following such enabling. However, the input resistor in shunt, will, at the same time, maintain variations which occur in such signal.

The above reduction will result in a lower level for the signal which, due to the previously described operation of the threshold detector 12, will cause the output of the detector to return to low. Then, after time delays, through the first, second and third stages of the time delay portion 16 of the modifier M, the gating current to the gate of the SCR 74 will be turned off. However, the SCR, in accordance with its normal operation, will remain enabled until its anode current is at a very low level, thus until the voltage at the amplifier-stylus connection approaches zero.

With reference to the described operation of the modifier M, the effect of the modifier on the unmodified, idealized amplifier output signal of FIG. 4(a) can be readily understood. In FIG. 4(a), the voltage T is the triggering level at which the positive input to the detector comparator 30 reaches the level of the negative input. The similarly somewhat idealized signal shown in FIG. 4(b), shows the high input to the gate of the SCR 74, a time delay after the triggering voltage T is reached. The gating input voltage, of course, then returns low a time interval following its excursion to the high level, due to the reduction of the amplifier output voltage.

Now referring to FIG. 4(c) which is an idealized modified amplifier output signal corresponding to the unmodified signal of FIG. 4(a), it is apparent that the modified signal is the same as the unmodified signal until the triggering voltage level T is reached. Then, the reduction in level of the envelope occurs until the envelope approaches zero. Therefore, the excursions indicative of the first and second fish and vegetation are still readily apparent, and the sea bed is well-delineated by its corresponding high level, and the rapid reduction. In addition, variations, following the reduction are preserved.

Figure 4:
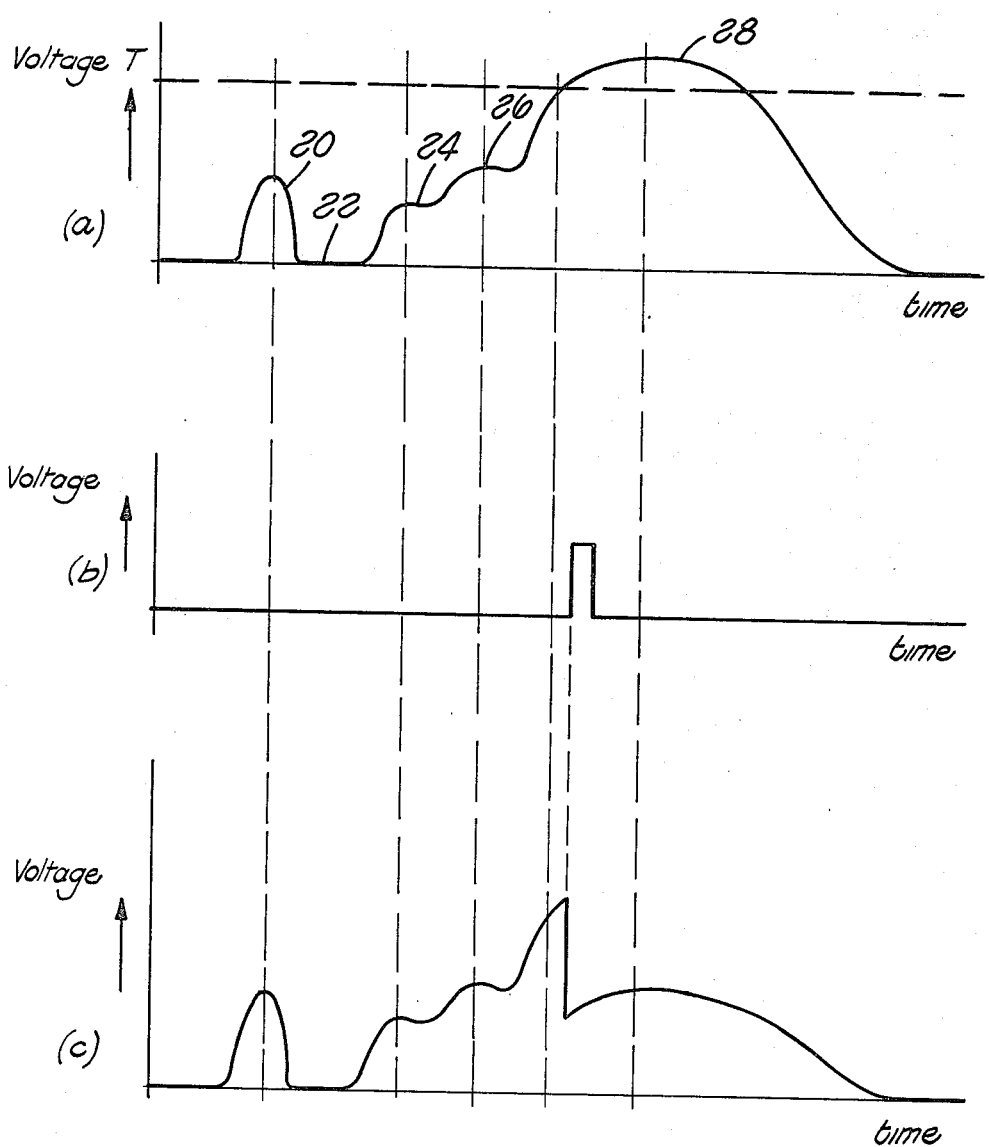
FIGS. 4(a)–(c) are idealized electrical signals to illustrate the operation of the apparatus of FIGS. 1–3.

With respect to the idealized signals of FIG. 4, though such should already be implicitly apparent, it perhaps should be explicitly noted that the signals shown in FIGS. 4(a) and 4(c) are directed only to the portions of the unmodified and modified amplifier output signals which correspond to echo signals, and not, e.g., to the transmitted explorer signal.

In the particular case illustrated in FIG. 4, the modifier M is set to cause a signal level reduction only when a signal as strong as the sea bed occurs. This is a desirable mode of operation. However, as an alternative, the modifier can also be set so that, for example, signals as strong as those caused by the first and second fish cause the reduction to occur. This is well illustrated in the actual recorder output shown in FIG. 5. In that display there are numerous examples of the onset and termination of the signal level reduction along single (vertical in FIG. 5) lines of the display.

Referring to FIG. 5, it is apparent that variations in the modified amplifier output following the onset of a signal level reduction, along a black-white or darkness-lightness continuum are preserved (see particularly below sea bed line). Such continuum, with or without such reduction, of course exists until a voltage level which completely burns off the cover layer for the graphite underlayer of the recorder paper, or a voltage level which is too low to burn off any of the cover layer, is presented to the stylus. As already noted, it is also evident that a display, as in FIG. 5, is made up of numerous vertical (with reference to FIG. 5), successive, parallel lines of output caused by the stylus moving along the paper and the synchronized movement of the paper perpendicular to the movement of the stylus.

Though the example of FIG. 5 does not show vegetation, it will be evident that where the apparatus is adjusted so that vegetation generally will not cause an amplifier output high enough to result in the signal reduction by the modifier, and where fish will, the operation of the apparatus is particularly well adapted to the locating of fish within vegetation. As is well evident in FIG. 5, such mode of operation also is particularly well adapted to locating fish near the sea bed.

It will be apparent that many changes and modifications may be made in the embodiment which has been described without departing from the spirit and scope of the invention.

I claim:

1. Echo ranging apparatus to locate fish, vegetation and structure in the sea, comprising:
    (a) transmitter means for transmitting pulsed explorer signals into the sea;
    (b) transducer means for receiving echo signals resulting from the reflection of said explorer signals from the fish, vegetation and structure and for converting said echo signals to electrical transducer signals representative of said echo signals;
    (c) receiver means for coupling to said transducer means to provide electrical receiver signals representative of said electrical transducer signals in response to said electrical transducer signals;
    (d) amplifier means for coupling to said receiver means to provide amplifier electrical signals representative of said electrical receiver signals;
    (e) modifying means for coupling to said amplifier means to modify said amplified electrical signals, said modifying means including,
        (1) threshold detector means for coupling to said amplifier means to provide electrical signals indicative of the levels of said amplified electrical signals, to compare said indicative signals with a reference signal and to provide detector output signals indicative of said comparing,
        (2) delay means coupled to said threshold detector means to provide, in response to said detector output signals, delay output signals indicative, after a time delay, of said comparing, and
        (3) signal reduction means for coupling to said amplifier means to, in response to indications by said delay output signals of said indicative signals surpassing said reference signal, reduce the levels of said amplified electrical signals while retaining variations in said levels; and
    (f) display means for coupling to said amplifier means to provide visual displays representative of the fish, vegetation and structure in response to said modified amplified electrical signals.

2. Echo ranging apparatus as defined in claim 1 wherein said signal reduction means comprises a resistor for coupling in parallel with said amplifier means for said reducing.

3. Echo ranging apparatus as defined in claim 1 wherein:
    (a) said amplifier means has a terminal for said modified amplified electrical signals;
    (b) said threshold detector means has a terminal for said modified amplified electrical signals;
    (c) said signal reduction means has a terminal for said modified amplified electrical signals; and
    (d) said three terminals are for directly connecting to one another.

4. Echo ranging apparatus as defined in claim 1 wherein said providing by said display means comprises adjusting a variable along successive straight lines of said displays provided by such display means in response to said modified amplified electrical signals.

5. Echo ranging apparatus as defined in claim 4 wherein said adjusting of said variable is along a continuum.

6. Echo ranging apparatus as defined in claim 5 wherein said variable is the degree of lightness and darkness.

7. A method of locating fish, vegetation and structure in the sea, comprising the steps of:
    (a) transmitting pulsed explorer signals into the sea;
    (b) receiving echo signals resulting from the reflection of said explorer signals from the fish, vegetation and structure;
    (c) generating electrical signals representative of said echo signals;
    (d) modifying said generated electrical signals, including,
        (1) providing electrical signals indicative of the levels of said generated signals,
        (2) comparing said indicative signals and a reference signal, and
        (3) reducing the levels of said generated electrical signals following a time delay commencing upon said indicative signals surpassing said reference signal, while retaining variations in the levels of said generated electrical signals; and
    (e) visually displaying the fish, vegetation and structure in response to said modified generated electrical signals.

8. The method of locating of claim 7 wherein said displaying step includes adjusting a variable along successive straight lines in response to said modified generated signals.

9. The method of locating of claim 8 wherein said adjusting of said variable is along a continuum.

10. The method of locating of claim 9 wherein said variable is the degree of lightness and darkness.

11. Echo ranging apparatus to locate fish, vegetation and structure in the sea, comprising:
    (a) transmitter means for transmitting pulsed explorer signals into the sea;
    (b) transducer means for receiving echo signals resulting from the reflection of said explorer signals from the fish, vegetation and structure and for converting said echo signals to electrical transducer signals representative of said echo signals;
    (c) receiver means for coupling to said transducer means to provide electrical receiver signals representative of said electrical transducer signals in response to said electrical transducer signals;

(d) amplifier means for coupling to said receiver means to provide amplified electrical signals representative of said electrical receiver signals;

(e) modifying means for coupling to said amplifier means to modify said amplified electrical signals, said modifying means including, (1) threshold detector means for coupling to said amplifier means to provide electrical signals indicative of the levels of said amplified electrical signals, to compare said indicative signals with a reference signal and to provide detector output signals indicative of said comparing, (2) delay means coupled to said threshold detector means to provide, in response to said detector output signals, delay output signals indicative, after a time delay, of said comparing, and (3) signal reduction means, including a signal reducing element, to, in response to indications by said delay output signals of said indicative signals surpassing said reference signal, couple said element to said amplifier means to reduce the levels of said amplified electrical signals while retaining variations in said levels and to, in response to said reduced levels of said amplified signals falling below a predetermined level, terminate said coupling of said element for said reducing; and (f) display means for coupling to said amplifier means to provide visual displays representative of the fish, vegetation and structure in response to said modified amplified electrical signals.

12. Echo ranging apparatus as defined in claim 11 wherein said signal reducing element comprises a resistor.

13. Echo ranging apparatus as defined in claim 11 wherein said signal reduction means comprises an SCR for said coupling and said terminating of said coupling.

14. A method of locating fish, vegetation and structure in the sea, comprising the steps of:

(a) transmitting pulsed explorer signals into the sea;

(b) receiving echo signals resulting from the reflection of said explorer signals from the fish, vegetation and structure;

(c) generating electrical signals representative of said echo signals;

(d) modifying said generated electrical signals, including, (1) providing electrical signals indicative of the levels of said generated signals, (2) comparing said indicative signals and a reference signal, (3) providing an electrical coupling following a time delay commencing upon said indicative signals surpassing said reference signal, (4) reducing the levels of said generated electrical signals in response to said electrical coupling, while retaining variations in the levels of said generated electrical signals, and (5) terminating said electrical coupling for said reducing in response to said reduced levels of said generated electrical signals falling below a predetermined level; and (e) visually displaying the fish, vegetation and structure in response to said modified generated electrical signals.

* * * * *